US010000703B2

(12) United States Patent
Sorensen et al.

(10) Patent No.: US 10,000,703 B2
(45) Date of Patent: Jun. 19, 2018

(54) CATALYTIC FAST PYROLYSIS PROCESS

(71) Applicant: Anellotech, Inc., Pearl River, NY (US)

(72) Inventors: Charles Sorensen, Haverstraw, NY (US); Ruozhi Song, Maple Valley, WA (US); Zachary Goodman, Rochester, MA (US); Collin Schmidt, Nyack, NY (US); Scott Johnstone, Peekskill, NY (US); Kevin Dolan, New City, NY (US); Megan Wagner, Nyack, NY (US)

(73) Assignee: ANELLOTECH, INC., Pearl River, NY (US)

( * ) Notice: Subject to any disclaimer, the term of this patent is extended or adjusted under 35 U.S.C. 154(b) by 225 days.

(21) Appl. No.: 15/140,049

(22) Filed: Apr. 27, 2016

(65) Prior Publication Data

US 2016/0326438 A1    Nov. 10, 2016

Related U.S. Application Data

(60) Provisional application No. 62/158,866, filed on May 8, 2015.

(51) Int. Cl.
*C10B 53/02* (2006.01)
*C10B 49/22* (2006.01)
(Continued)

(52) U.S. Cl.
CPC ............ *C10B 53/02* (2013.01); *C10B 49/22* (2013.01); *C10B 57/06* (2013.01); *C10G 1/083* (2013.01); *C10G 1/086* (2013.01); *C10G 3/44* (2013.01); *C10G 3/57* (2013.01); *Y02E 50/14* (2013.01); *Y02E 50/32* (2013.01); *Y02P 20/145* (2015.11)

(58) Field of Classification Search
CPC .......... C10B 53/02; C10G 1/08; C10G 1/083; C10G 1/086; C10G 3/44; C10G 3/57; C10G 3/62
See application file for complete search history.

(56) References Cited

U.S. PATENT DOCUMENTS 7,905,990 B2    3/2011  Freel
8,277,643 B2    10/2012 Huber et al.
(Continued)

FOREIGN PATENT DOCUMENTS

WO    WO 2014/089131    *  6/2014    ............. B01J 23/24

*Primary Examiner* — Renee E Robinson
(74) *Attorney, Agent, or Firm* — Roberts Mlotkowski Safran Cole & Calderon P.C.

(57) ABSTRACT

The present invention provides an improved catalytic fast pyrolysis process for increased yield of useful and desirable products, while greatly reducing or eliminating fouling of various critical process lines which are likely to transfer heavy hydrocarbons, aromatics and oxygenates. The process comprises steps including feeding a fluid solvent stream having a Snyder Polarity Index of at least 2.4 to one or more of i) the raw fluid product stream from a catalytic fast pyrolysis process fluidized bed reactor to a first separation system, ii) the fluid product stream from the first separation system to a quench vapor/liquid separation system, iii) the vapor phase stream from the quench vapor/liquid separation system to a product recovery system, and, optionally, to the spent catalyst steam stripping system upstream of the catalyst regeneration system.

31 Claims, 1 Drawing Sheet

(51) Int. Cl.
*C10B 57/06* (2006.01)
*C10G 3/00* (2006.01)
*C10G 1/08* (2006.01)

(56) References Cited

U.S. PATENT DOCUMENTS

| | | |
|---|---|---|
| 8,864,984 B2 | 10/2014 | Huber et al. |
| 2012/0167452 A1 | 7/2012 | Platon et al. |
| 2012/0203042 A1 | 8/2012 | Huber et al. |
| 2013/0060070 A1* | 3/2013 | Huber .................... C10B 49/22 585/242 |
| 2013/0324772 A1* | 12/2013 | Huber .................... C10G 1/002 585/242 |
| 2014/0027265 A1 | 1/2014 | Mazanec et al. |
| 2014/0102874 A1 | 4/2014 | Keusenkothen |
| 2014/0107306 A1 | 4/2014 | Mazanec et al. |
| 2014/0303414 A1 | 10/2014 | Mazanec et al. |
| 2016/0040077 A1 | 2/2016 | Bauer et al. |

\* cited by examiner

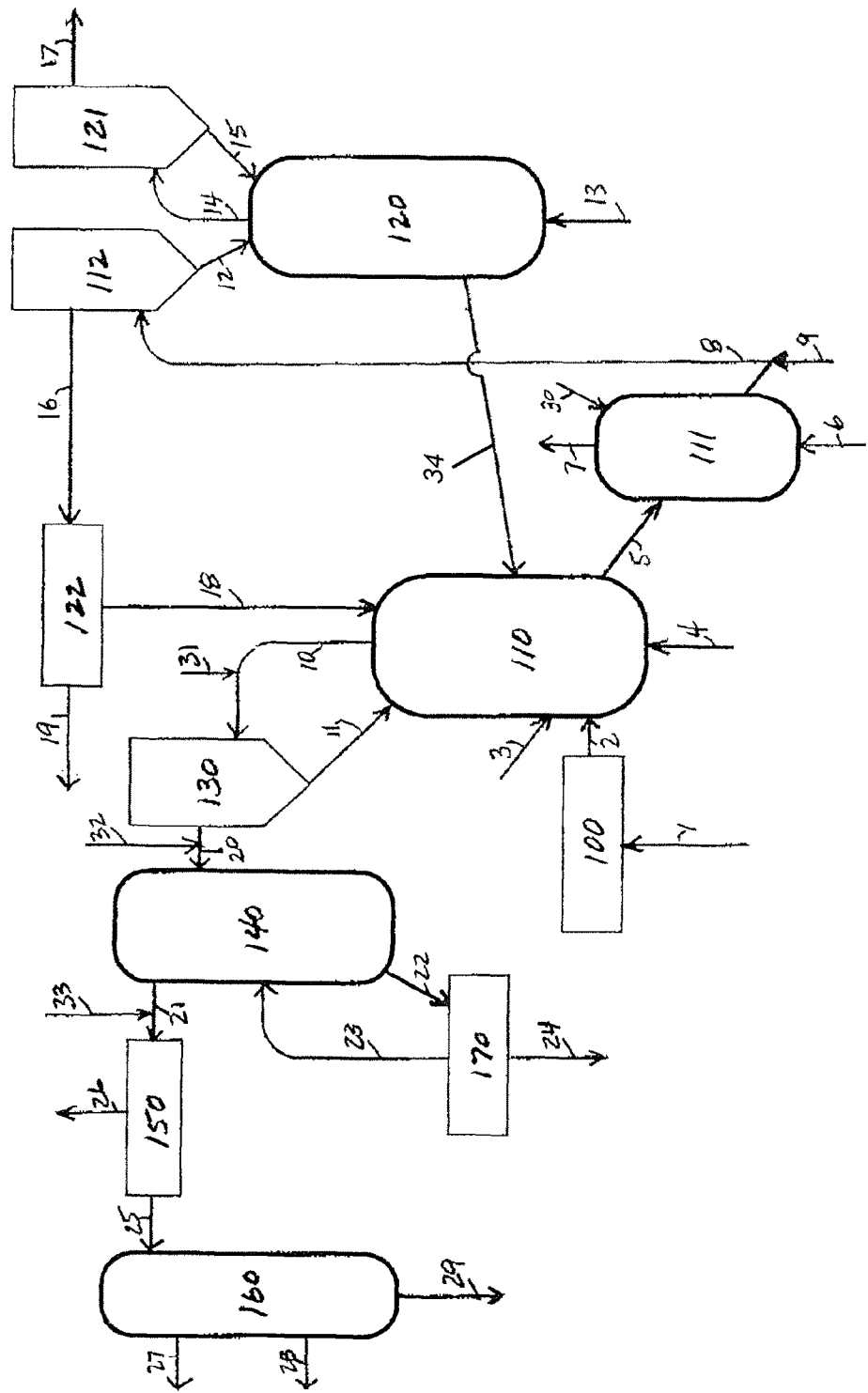

CATALYTIC FAST PYROLYSIS PROCESS

RELATED APPLICATION

This is related to Provisional Patent Application No. 62/158,866, filed in the United States Patent and Trademark Office on May 8, 2015.

FIELD OF THE INVENTION

The present invention relates to an improved catalytic fast pyrolysis process. In particular, it relates to an improved catalytic fast pyrolysis process including effective steps for preventing fouling of various critical process lines which are likely to transfer heavy hydrocarbons, aromatics, and oxygenates.

BACKGROUND OF THE INVENTION

The needs for travel and consumer goods have driven the ever increasing consumption of fossil fuels such as coal and oil, typically obtained from deep underground. The extraction of fossil fuels by mining and drilling has often been accompanied by environmental and political costs. Furthermore, as the more accessible sources of fossil fuels are being used up, this has led to the pursuit of more expensive extraction technologies such as fracking and deep sea drilling. Additionally, the consumption of fossil fuels causes higher levels of atmospheric carbon, typically in the form of carbon dioxide.

To reduce these problems, there have been extensive efforts made in converting biomass to fuels and other useful chemicals. Unlike fossil fuels, biomass is renewable and carbon-neutral; that is, biomass-derived fuels and chemicals do not lead to increased atmospheric carbon since the growth of biomass consumes atmospheric carbon.

Much of the work on biomass has involved converting refined biomass including vegetable oils, starches, and sugars; however, since these types of refined biomass may alternatively be consumed as food, there is even a greater utility for converting non-food biomass such as agricultural waste (bagasse, straw, corn stover, corn husks, etc.), energy crops (like switch grass and saw grass), trees and forestry waste, such as wood chips and saw dust, waste from paper mills, plastic waste, recycled plastics or algae, in combination sometimes referred to as cellulosic biomass. Biomass generally includes three main components: lignin, hemicellulose, and cellulose.

Generating fuels and chemicals from biomass requires specialized conversion processes different from conventional petroleum-based conversion processes due to the nature of the feedstock. High temperatures, solid feed, high concentrations of water, unusual separations, and oxygenated by-products are some of the features of biomass conversion that are distinct from those encountered in petroleum upgrading. Thus, despite extensive efforts, there are many challenges that must be overcome to efficiently produce chemicals or fuels from biomass. Such challenges include the tendency of the heavy hydrocarbons, aromatics, and oxygenates manufactured by catalytic fast pyrolysis to form a sticky tar-like substance that easily deposits on tubes and downstream equipment if not reduced or eliminated from the process streams.

A variety of biomass-derived polymeric materials such as lignin, cellulose, and hemicellulose, can be pyrolyzed to produce mixtures of aromatics, olefins, carbon monoxide (CO), carbon dioxide ($CO_2$), water, and other products. A particularly desirable form of pyrolysis is known as catalytic fast pyrolysis (CFP) which involves the conversion of biomass in a catalytic fluid bed reactor to produce a mixture of aromatics, olefins, and a variety of other materials. The aromatics include benzene, toluene, xylenes (collectively BTX), and naphthalene, among other aromatics. The olefins include ethylene, propylene, and lesser amounts of higher molecular weight olefins.

The raw effluent from a CFP process is a complex mixture that comprises aromatics, olefins, oxygenates, paraffins, $H_2$, $CH_4$, CO, $CO_2$, water, char, ash, coke, catalyst fines, and a host of other compounds. Manufacture, separation, and recovery of the various components, especially those found to be more valuable, from this complex mixture is increasingly important.

In U.S. Patent Publication No. 2014/0107306 A1, a method and apparatus are described for pyrolysis of biomass and conversion of at least one pyrolysis product to another chemical compound. The latter method comprises feeding a hydrocarbonaceous material to a reactor, pyrolyzing within the reactor at least a portion of the hydrocarbonaceous material under reaction conditions sufficient to produce one or more pyrolysis products, catalytically reacting at least a portion of the pyrolysis products, separating at least a portion of the hydrocarbon products, and reacting a portion of the hydrocarbon products to produce a chemical intermediate.

In U.S. Pat. Nos. 8,277,643 and 8,864,984; U. S. Patent Publication Nos. 2012/0203042 A1, 2013/0060070 A1, 2014/0027265 A1, and 2014/0303414 A1, each incorporated herein by reference in its entirety, apparatus and process conditions suitable for CFP are described.

It is a general goal of this technology to provide high yields of useful products, such as BTX, usually the most valuable products, with reduced or eliminated production of tar-like substances. Under operating conditions currently employed in CFP, heavy hydrocarbons having a tendency to form sticky, tar-like substances ("fouling" or "gunk") are manufactured. This fouling/gunk easily deposits on tubes and downstream equipment.

In U.S. Pat. No. 7,905,990, it appears that fouling may be mitigated in a non-catalytic thermal biomass conversion process by directing the hot vapor stream from the reactor to at least one condensing chamber where the hot vapor stream is rapidly cooled by flow of a quench media. In U. S. Patent Publication No. 2012/0167452 A1, a non-catalytic thermal biomass conversion process is described where a solvent selected from the group consisting of hydrocarbon solvent, substituted hydrocarbon solvent, and combinations thereof, is used as a quench fluid. The hot biomass pyrolysis products are contacted with quench fluid in absorption and quench apparatus.

In U. S. Patent Application No. 2016/0040077, a process and system for hydroprocessing biopyrolysis oils is provided that includes the rejuvenation of a partially flow constricted reactor by flushing with a flushing agent at reduced temperatures. The process requires the reactor system to be cooled to facilitate the rejuvenation, and hence must be conducted in an intermittent fashion and cannot be conducted in a continuous fashion.

In U. S. Patent Application 2014/0102874, a pyrolysis process is provided to remove coke and tar as a flushing fluid is applied or injected directly into a regenerative pyrolysis reactor operated in a cyclic or periodic manner No provision is made for continuous production as the reactor is operated in a sequence of alternating heating and regeneration steps.

In light of current commercial practices and the disclosures of art, a simple economical process for enhancing production of useful products with reduced or eliminated fouling from a catalytic fast pyrolysis process is needed. The present invention provides such a process.

SUMMARY OF THE INVENTION

Various aspects of the present invention include increased yield of useful and desirable products, such as, for example, benzene, toluene, and xylenes, in a CFP process, conducted with greatly reduced or eliminated fouling of critical process lines. The present invention provides for this in an economical improved process. An embodiment of the present process comprises the steps of: a) feeding biomass, catalyst composition, and transport fluid to a catalytic fast pyrolysis process fluidized bed reactor maintained at reaction conditions to manufacture a raw fluid product stream, b) feeding the raw fluid product stream of step a) to a solids separation system to produce separated solids and a fluid product stream, c) feeding the fluid product stream of step b) to a quench vapor/liquid separation system utilizing water or hydrocarbon quench to produce a liquid phase stream comprising water, char, coke, ash, catalyst fines, oxygenates, and $C_9^+$ aromatics, and a vapor phase stream comprising CO, $CO_2$, hydrogen, olefins, and aromatics, said aromatics selected from the group consisting of benzene, toluene, xylenes, phenols, naphthols, benzofuran, ethylbenzene, styrene, naphthalene, methylnaphthalene and combinations thereof, d) feeding a fluid solvent stream comprising components selected from the group consisting of aliphatic ketones, alcohols, esters, ethers, phenols, naphthols, benzofuran and combinations thereof to one or more of i) the raw fluid product stream of step a), ii) the fluid product stream of step b), and the vapor phase stream of step c), e) feeding the vapor phase stream of step c) to a product recovery system to recover benzene, toluene, xylenes, phenols, naphthols, benzofuran, ethylbenzene, styrene, naphthalene and/or methylnaphthalene, and f) recycling at least a portion of the recovered phenols, naphthols and/or benzofuran of step e) to the fluid solvent stream of step d).

Another embodiment of the present invention comprises such process comprising further steps of: g) feeding spent catalyst composition of the fluidized bed reactor of step a) to a steam stripping system, h) optionally feeding a fluid solvent stream comprising components selected from the group consisting of aliphatic ketones, esters, ethers, phenols, naphthols, benzofuran, and combinations thereof to the steam stripping system of step g), i) feeding the product catalyst composition of step g) to a catalyst composition regeneration system, and j) returning regenerated catalyst composition from the regeneration system of step i) to the fluidized bed reactor step a).

Another embodiment of the present invention comprises such process comprising the further step: k) recycling at least a portion of the recovered toluene of step e) to the fluidized bed reactor of step a). Another embodiment of the present invention comprises such process comprising the further step: l) recycling at least a portion of the recovered toluene of step e) to the fluid solvent stream of step d).

Another embodiment of the present invention comprises such process comprising the further steps: m) separating at least a portion of the olefins from the vapor phase stream of step c), and n) recycling at least a portion of the separated olefins of step m) to the fluidized bed reactor of step a).

Another embodiment of the present invention comprises such process wherein the catalyst composition of step a) comprises a crystalline molecular sieve characterized by a silica/alumina mole ratio (SAR) greater than 12 and a Constraint Index (CI, hereinafter more particularly described) from 1 to 12, such as a crystalline molecular sieve selected from those having the structure of ZSM-5, ZSM-11, ZSM-12, ZSM-22, ZSM-23, ZSM-35, ZSM-48, ZSM-50 or combinations thereof.

Another embodiment of the invention process comprises the steps of: a) feeding biomass, catalyst composition comprising a crystalline molecular sieve characterized by an SAR greater than 12 and a CI from 1 to 12, e.g., having the structure of ZSM-5, and transport fluid to a catalytic fast pyrolysis process fluidized bed reactor maintained at reaction conditions including a temperature from 300° C. to 1000° C., pressure from 100 kPa to 1500 kPa and catalyst-to-biomass mass ratio of from 0.1 and 40 to manufacture a raw fluid product stream, b) feeding the raw fluid product stream of step a) to a solids separation system to produce separated solids and a fluid product stream, c) feeding the fluid product stream of step b) to a quench vapor/liquid separation system utilizing water or hydrocarbon quench to produce a liquid phase stream comprising water, char, coke, ash, catalyst fines, oxygenates, and $C_9^+$ aromatics, and a vapor phase stream comprising CO, $CO_2$, hydrogen, olefins and aromatics, said aromatics selected from the group consisting of benzene, toluene, xylenes, phenols, naphthols, benzofuran, ethylbenzene, styrene, naphthalene, methylnaphthalene and combinations thereof, d) feeding a fluid solvent stream comprising components selected from the group consisting of methanol, ethanol, propanol, butanol, pentanol, hexanol, acetone, methyl ethyl ketone, phenol, o-cresol, m-cresol, p-cresol, catechol, resorcinol, hydroquinone, 1-naphthol, 2-naphthol, benzofuran, methyl acetate, ethyl acetate, and combinations thereof to one or more of i) the raw fluid product stream of step a), the fluid product stream of step b), and the vapor phase stream of step c), e) feeding the vapor phase stream of step c) to a product recovery system to recover benzene, toluene, xylenes, phenols, naphthols, benzofuran, ethylbenzene, styrene, naphthalene, methylnaphthalene and/or other oxygenates, f) recycling from about 10% to about 100%, for example from 10% to 99%, of the recovered compounds comprising phenols, naphthols benzofuran and/or other oxygenates of step e) to the fluid solvent stream of step d), g) feeding spent catalyst composition of the fluidized bed reactor of step a) to a steam stripping system to produce a product catalyst composition, h) optionally feeding a fluid solvent stream comprising components selected from the group consisting of methanol, ethanol, propanol, butanol, pentanol, hexanol, acetone, methyl ethyl ketone, phenol, o-cresol, m-cresol, p-cresol, catechol, resorcinol, hydroquinone, 1-naphthol, 2-naphthol, benzofuran, methyl acetate, ethyl acetate, and combinations thereof to the steam stripping system of step g), i) feeding the product catalyst composition of step g) to a catalyst composition regeneration system, j) returning regenerated catalyst composition from the regeneration system of step i) to the fluidized bed reactor of step a), k) optionally recycling from about 5% to about 99% of the recovered toluene of step e) to the fluidized bed reactor of step a), and l) optionally recycling up to about 50% of the recovered toluene of step e) to the fluid solvent stream of step d).

BRIEF DESCRIPTION OF THE DRAWING

FIG. 1 is a block flow illustration of an embodiment of the present process.

DETAILED DESCRIPTION OF THE INVENTION

As a result of extensive research in view of the above, we have found that we can economically and effectively conduct a CFP process to enhance manufacture of valuable products, such as benzene, toluene, and xylenes, while greatly reducing or eliminating fouling of critical process lines by way of a series of sequential steps.

The present improved process comprises steps of: a) feeding biomass, such as, for example, that provided from renewable sources of organic materials, catalyst composition comprising one or more of a particular family of crystalline molecular sieves, for example, those characterized by a SAR greater than 12 and a CI from 1 to 12, and transport fluid, for example, recycle gas or other fluidization fluid, to a CFP process fluidized bed reactor maintained at specific reaction conditions, for example, a temperature from 300° C. to 1000° C. and pressure from 100 kPa to 1500 kPa, to manufacture a raw fluid product stream, b) feeding the raw fluid product stream of step a) to a solids separation system, hereinafter more particularly described, to produce separated solids and a fluid product stream, c) feeding the fluid product stream of step b) to a quench vapor/liquid separation system utilizing water or hydrocarbon quench, hereinafter more particularly described, to produce a liquid phase stream comprising various components, such as those selected from the group consisting of water, char, coke, ash, catalyst fines, $C_9^+$ aromatics, oxygenates, and combinations thereof, and a vapor phase stream comprising CO, $CO_2$, hydrogen, olefins and aromatics, said aromatics selected from the group consisting of benzene, toluene, xylenes, phenols, naphthols, benzofuran, ethylbenzene, styrene, naphthalene, methylnaphthalene and combinations thereof, d) feeding a fluid solvent stream comprising components selected from the group consisting of aliphatic alcohols (e.g., methanol, ethanol, propanol, butanol, pentanol and, hexanol), aliphatic ketones (e.g., acetone and methyl ethyl ketone), ethers (e.g. diethyl ether, diphenyl ether, phenyl benzyl ether and phenyl ethyl ether), phenols (e.g., phenol, o-cresol, m-cresol, p-cresol, catechol, resorcinol, and hydroquinone), naphthols (e.g., 1-naphthol and 2-naphthol), benzofuran, and combinations thereof to one or more of i) the raw fluid product stream of step a), the fluid product stream of step b), and the vapor phase stream of step c), e) feeding the vapor phase stream of step c) to a product recovery system, hereinafter more particularly described, to recover benzene, toluene, xylenes, phenols, naphthols, benzofuran, ethylbenzene, styrene, naphthalene, and/or methylnaphthalene, and f) recycling at least a portion of the recovered phenols, naphthols and/or benzofuran of step e) to the fluid solvent stream of step d).

The present improved process may comprise further steps of: g) feeding spent catalyst composition of the fluidized bed reactor of step a) to a steam stripping system, hereinafter more particularly described, to produce product catalyst composition, h) optionally feeding a fluid solvent stream comprising components selected from the group consisting of aliphatic alcohols (e.g., methanol, ethanol, propanol, butanol, pentanol and, hexanol), aliphatic ketones (e.g., acetone and methyl ethyl ketone), ethers (e.g. diethyl ether, diphenyl ether, phenyl benzyl ether, phenyl ethyl ether,), phenols (e.g., phenol, o-cresol, m-cresol, p-cresol, catechol, resorcinol, and hydroquinone), naphthols (e.g., 1-naphthol and 2-naphthol), benzofuran, and combinations thereof to the steam stripping system of step g), i) feeding the product catalyst composition of step g) to a catalyst composition regeneration system, hereinafter more particularly described, and j) returning regenerated catalyst composition from the regeneration system of step i) to the fluidized bed reactor step a).

The present improved process may comprise further steps of: k) recycling at least a portion of the recovered toluene of step e) to the fluidized bed reactor of step a), or l) recycling at least a portion of the recovered toluene of step e) to the fluid solvent stream of step d), or both.

Another embodiment of the present invention comprises such process comprising the further steps: m) separating at least a portion of the olefins from the vapor phase stream of step c), and n) recycling at least a portion of the separated olefins of step m) to the fluidized bed reactor of step a).

It is noted that steps a) and b) may be thought of as comprising a CFP process reaction in a fluidized bed reactor to produce a fluid product stream which is in turn fed to a quench vapor/liquid separation system utilizing water or hydrocarbon quench.

As used herein, the terms "aromatics" or "aromatic compound" refer to a hydrocarbon compound or compounds comprising one or more aromatic groups such as, for example, single aromatic ring systems (e.g., benzyl, phenyl, etc.) and fused polycyclic aromatic ring systems (e.g., naphthyl, 1,2,3,4-tetrahydronaphthyl, etc.). Examples of aromatic compounds include, but are not limited to, benzene, toluene, indane, indene, 2-ethyltoluene, 3-ethyltoluene, 4-ethyltoluene, trimethylbenzene (e.g., 1,3,5-trimethylbenzene, 1,2,4-trimethylbenzene, 1,2,3-trimethylbenzene, etc.), ethylbenzene, styrene, cumene, n-propylbenzene, xylenes (e.g., p-xylene, m-xylene, o-xylene), naphthalene, methylnaphthalene (e.g., 1-methylnaphthalene), anthracene, 9,10-dimethylanthracene, pyrene, phenanthrene, dimethyl naphthalene (e.g., 1,5-dimethylnaphthalene, 1,6-dimethylnaphthalene, 2,5-dimethylnaphthalene, etc.), ethyl naphthalene, hydrindene, methylhydrindene, and dimethylhydrindene. Single ring and/or higher ring aromatics may also be produced in some embodiments. Aromatics may also include single and multiple ring compounds that contain heteroatom substituents, i.e., phenol, cresols, naphthols, benzofuran, aniline, indole, etc.

As used herein, the term "biomass" has its conventional meaning in the art and refers to any organic source of energy or chemicals that is renewable. Its major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living or recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burned as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae, wood, wood chips, forestry waste, rice straw, rice hulls, rice bran, old rice, corn, sugarcane, cassava, sago palm, bean curd, corn cob, tapioca, bagasse, vegetable oil residues, potatoes, buckwheat, soybean, oils and fats, waste paper, paper manufacturing residues, marine products residues, sewage sludge, algae, and the like, or combinations thereof. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass.

As used herein, the terms "olefin" or "olefin compound" (a.k.a. "alkenes") have their ordinary meaning in the art, and refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed ring) or of an open chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2-methylpropene), butadiene, and isoprene, among others. Examples of cyclic olefins include cyclopentene, cyclohexene, and cycloheptene, among others. Aromatic compounds such as toluene are not considered olefins; however, olefins that include aromatic moieties are considered olefins, for example, benzyl acrylate or styrene.

As used herein, the term 'oxygenate" includes any organic compound that contains at least one atom of oxygen in its structure such as alcohols (e.g., methanol, ethanol, etc.), acids (e.g., acetic acid, propionic acid, etc.), aldehydes (e.g., formaldehyde, acetaldehyde, etc), esters (e.g., methyl acetate, ethyl acetate, etc.), ketones (e.g. acetone, methyl ethyl ketone, etc.), ethers (e.g., dimethyl ether, diethyl ether, etc.), aromatics with oxygen containing substituents (e.g., phenol, cresols, naphthols, benzoic acid etc.), cyclic ethers, acids, aldehydes, and esters (e.g. furan, furfural, etc.), and the like. It is noted that oxygenates other than phenols, naphthols and benzofuran, if desired, may be recovered in step e), and may be recycled in step f) to the fluid solvent stream of step d).

As used herein, the terms "pyrolysis" and "pyrolyzing" have their conventional meaning in the art and refer to the transformation of a compound, e.g., a solid hydrocarbonaceous material, into one or more other substances, e.g., volatile organic compounds, gases and coke, by heat, preferably without the addition of, or in the absence of, oxygen. Preferably, the volume fraction of oxygen present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Catalytic fast pyrolysis (CFP) that involves the conversion of biomass in a catalytic fluid bed reactor to produce a mixture of aromatics, olefins, and a variety of other materials is a particularly beneficial pyrolysis process. Examples of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098, incorporated herein by reference.

The catalyst composition required in the CFP process fluidized bed reactor of the present invention comprises a crystalline molecular sieve, such as, for example, one characterized by an SAR greater than 12 and a CI from 1 to 12. Non-limiting examples of these crystalline molecular sieves are those having the structure of ZSM-5, ZSM-11, ZSM-12, ZSM-22, ZSM-23, ZSM-35, ZSM-48, ZSM-50 or combinations thereof. As an embodiment, the catalyst composition comprises a crystalline molecular sieve characterized by an SAR from greater than 12 to 240 and a CI from 5 to 10, such as, for example, a molecular sieve having the structure of ZSM-5, ZSM-11, ZSM-22, ZSM-23 or combinations thereof.

The members of the class of molecular sieves useful herein have an effective pore size of generally from about 5 Angstroms to about 8 Angstroms, such as to freely sorb normal hexane. In addition, the molecular sieve structure must provide constrained access to larger molecules. For example, if the only pore windows in a molecular sieve structure are formed by 8-membered rings of silicon and aluminum atoms, then access by molecules of larger cross-section than normal hexane is excluded and the molecular sieve is not of the desired type for use herein. Windows of 10-membered rings are preferred, although, in some instances, excessive puckering of the rings or pore blockage may render these molecular sieves ineffective.

A convenient measure of the extent to which a molecular sieve provides control to molecules of varying sizes to its internal structure is the Constraint Index (CI) value of the crystal. Crystalline materials which provide a highly restricted access to and egress from its internal structure have a high value for the CI, and materials of this kind usually have pores of small size, e.g. less than 5 Angstroms. On the other hand, crystalline materials which provide relatively free access to the internal crystal structure have a low value for the CI, and usually have pores of large size, e.g. greater than 8 Angstroms. A simple determination of the CI may be made by passing continuously a mixture of an equal weight of normal hexane and 3-methylpentane over a small sample, approximately 1 gram or less, of crystalline material at atmospheric pressure according to the following procedure. The sample of the crystalline material, in the form of pellets or extrudate, is crushed to a particle size about that of coarse sand and mounted in a glass tube. Prior to testing, the crystalline material is treated with a stream of air at 537° C. for at least 15 minutes. The crystalline material is then flushed with helium and the temperature adjusted between 287° C., and 510° C. or higher to allow an overall conversion of between 10% and 60% when the mixture of hydrocarbons is passed at 1 liquid hourly space velocity (i.e., 1 volume of liquid hydrocarbon per volume of crystalline material per hour) over the crystalline material with a helium dilution to give a helium to total hydrocarbon mole ratio of 4:1. After 20 minutes on stream, a sample of the effluent is analyzed, most conveniently by gas chromatography, to determine the fraction remaining unchanged for each of the two hydrocarbons. The CI is the ratio of the log of the n-hexane remaining divided by the log of the 3-methylpentane remaining. The CI approximates the ratio of the cracking rate constants for the two hydrocarbons. The method by which CI is determined is described more fully in U.S. Pat. No. 4,029,716, incorporated by reference for details of the method.

Constraint Index (CO values for some typical materials are:

|  | CI | Test Temp, ° C. |
|---|---|---|
| ZSM-4 | 0.5 | 316 |
| ZSM-5 | 6-8.3 | 371-316 |
| ZSM-11 | 5-8.7 | 371-316 |
| ZSM-12 | 2.3 | 316 |
| ZSM-20 | 0.5 | 371 |
| ZSM-22 | 7.3 | 427 |
| ZSM-23 | 9.1 | 427 |
| ZSM-34 | 50 | 371 |
| ZSM-35 | 4.5 | 454 |
| ZSM-48 | 3.5 | 538 |
| ZSM-50 | 2.1 | 427 |
| Mordenite | 0.5 | 316 |
| REY | 0.4 | 316 |
| Dealuminized Y | 0.5 | 510 |
| Beta | 0.6-2 | 316-399 |

CI values typically characterize the specified crystalline material, but are the cumulative result of several variables useful in the determination and calculation thereof. Thus, for a given crystal exhibiting a CI value within the range of 1 to 12, depending on the temperature employed during the test method, with accompanying conversion between 10 and 60%, the CI may vary within the indicated range of 1 to 12. Likewise, other variables such as crystal size or the presence of possibly occluded contaminants and binders intimately combined with the crystal may affect the CI. It is understood to those skilled in the art that the CI, as utilized herein, while affording a highly useful means for characterizing the molecular sieves of interest is approximate, taking into consideration the manner of its determination, with the possibility, in some instances, of compounding variable extremes. However, in all instances, at a temperature within the above-specified range, the CI will have a value for any given molecular sieve useful herein within the approximate range of 1 to 12.

The molecular sieve for use herein or the catalyst composition comprising same may be thermally treated at high temperatures. This thermal treatment is generally performed by heating at a temperature of at least 370° C. for a least 1 minute and generally not longer than 20 hours (typically in an oxygen containing atmosphere, preferably air). While subatmospheric pressure can be employed for the thermal treatment, atmospheric pressure is desired for reasons of convenience. The thermal treatment can be performed at a temperature up to about 925° C. The thermally treated product is particularly useful in the present process.

For the catalyst composition useful in this invention, the suitable molecular sieve may be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite, kieselguhr and combinations thereof. The relative proportion of suitable crystalline molecular sieve of the total catalyst composition may vary widely with the molecular sieve content ranging from about 30% to about 90% by weight and more usually in the range of about 40% to about 70% by weight of the composition. The catalyst composition may be in the form of an extrudate, heads or fluidizable microspheres.

The molecular sieve for use herein or the catalyst composition comprising it may have original cations replaced, in accordance with techniques well known in the art, at least in part, by ion exchange with hydrogen or hydrogen precursor cations and/or non-noble metal ions of Group Viii of the Periodic Table, i.e. nickel, iron and/or cobalt, or metal ions selected from among titanium, vanadium, chromium, manganese, copper, gallium, germanium, zinc, cerium, lanthanum, and other rare earth metals (i.e. elements 57-71 of the Periodic Table), or combinations thereof.

Examples of apparatus and process conditions suitable for the CFP process are described in U.S. Pat. Nos. 8,277,643 and 8,864,984, and U. S. Patent Publication Nos. 2012/0203042 A1, 2014/0027265 A1, 2014/0303414 A1 and 2013/0060070A1, each incorporated herein by reference. Conditions for CFP of biomass may include one or a combination of the following features (which are not intended to limit the broader aspects of the invention): a catalyst composition; that catalyst composition comprising a metal selected from the group consisting of titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof; a fluidized bed, circulating bed, moving bed, or riser reactor; an operating temperature in the range of 300° C. to 1000° C.; and a solid catalyst/biomass mass ratio of from 0.1 and 40.

Referring more particularly to FIG. 1, which shows a block flow illustration of an embodiment of the present process. Biomass feedstock from line 1 is prepared by chipping, drying, grinding, washing or other processes, or some combination of these in biomass preparation system 100, and fed to CFP fluid bed reactor 110 via line 2. Catalyst composition comprising a crystalline molecular sieve characterized by an SAR greater than 12, e.g. from greater than 12 to 240, and a CI from 1 to 12, e.g. having the structure of ZSM-5, and transport fluid, e.g. recycle gas, are introduced to the CFP reactor 110 via lines 3 and 4, respectively. The CFP reactor is fluidized by the recycle gas or other fluid. The raw fluid product stream from the CFP reactor 110 is provided to solids separation system 130 via line 10. Spent solid catalyst material from reactor 110 is passed to a steam stripping system 111 via line 5. Steam is fed to the steam stripping system via line 6, and removed therefrom via line 7. Product solid catalyst material from the steam stripping system 111 is fed to separator 112, e.g. one or more cyclones, via line 8, with flow thereof enhanced by injection of pressurized fluid, e.g. an $N_2$/air mixture, via line 9. Solid catalyst material separated in separator 112 is fed via line 12 to regenerator 120, and char separated from the catalyst material in separator 112 is fed via line 16 to a combustion/treatment system 122. From system 122 are obtained partial oxidation products returned to reactor 110 via line 18, and exhaust removed via line 19. The exhaust can also be used to provide heat to reactor 110. Into the bottom of regenerator 120 is injected fluid having a temperature of from 25° C. to 350° C., e.g. an air/$N_2$ mixture, via line 13.

An overhead stream from regenerator 120 is fed via line 14 to separator 121, e.g. one or more cyclones, from which a bottoms material is returned to regenerator 120 via line 15, and exhaust removed via line 17. Regenerated catalyst composition is returned from regenerator 120 to reactor 110 via line 34 (a source of heat to reactor 110).

From solids separation system 130 is obtained separated solids which are returned to reactor 110 via line 11, and a fluid product stream fed to quench system 140 via line 20. Quench fluid, composed of from 75% to 100% water, is fed via line 23 to quench system 140. A liquid phase stream comprising components selected from the group consisting of water, char, coke, ash, catalyst fines, oxygenates, and $C_9^+$ aromatics is passed from quench system 140 via line 22 to separation system 170. From separation system 170 is removed a stream 24 comprising $C_9^+$ products and stream 23 comprising water for recycle to quench system 140. Excess water may be removed from stream 23 (not shown) upstream of the quench system as needed.

A vapor phase stream comprising CO, $CO_2$, hydrogen, olefins and aromatics, said aromatics including benzene, toluene, xylenes, phenols (e.g. phenol and cresols), naphthols, and methylnaphthalene is passed from quench system 140 via line 21 to product recovery system 150, from which a stream comprising CO, $CO_2$, hydrogen, and olefins is recovered via line 26, and a stream comprising aromatics, including benzene, toluene, xylenes, phenols (e.g. phenol and cresols), naphthols, and methylnaphthalene is passed to separation system 160 via line 25 for separation and recovery of benzene and toluene via line 27, xylenes vial line 28, and other aromatics and $C_9^+$ products via line 29.

In FIG. 1 is shown embodiments of the present invention where a fluid solvent stream comprising components selected from the group consisting of aliphatic alcohols (e.g., methanol, ethanol, propanol, butanol, pentanol and hexanol), aliphatic ketones (e.g., acetone and methyl ethyl ketone), ethers (e.g. diethyl ether, diphenyl ether, phenyl benzyl ether, phenyl ethyl ether,), phenols (e.g., phenol, o-cresol, m-cresol, p-cresol, catechol, resorcinol, and hydroquinone), naphthols (e.g., 1-naphthol and 2-naphthol), esters, benzofuran, and combinations thereof is passed to one or more of: i) the raw fluid product stream from reactor 110 via line 31, ii) the fluid product stream from separator 130 via line 32, and iii) the vapor phase stream from quench system 140 via line 33. Also shown in FIG. 1 is the further optional addition of that fluid solvent stream to stripping system 111 via line 30.

The CFP reactor 110 may be operated at a temperature from 300° C. to 1000° C., and the raw fluid product stream from reactor 110 is typically at a temperature of 300° C. to 620° C., such as 400° C. to 575° C., for example 500° C. to 550° C., and a pressure of 100 kPa to 1500 kPa, such as 200 kPa to 1000 kPa, for example 300 kPa to 700 kPa (pressures expressed as absolute pressures). The raw fluid product stream from reactor 110 comprises aromatics, olefins, oxygenates, paraffins, $H_2$, $CH_4$, CO, $CO_2$, water, char, ash, coke, catalyst fines, and a host of other components. On a water-free and solids-free basis the raw fluid product stream can comprise 20% to 60%, such as 25% to 55%, for example 30% to 50% CO; 10% to 50%, such as 15% to 40%, for example 20% to 35% $CO_2$; 0.1% to 10%, such as 0.2% to 5%, for example 0.3% to 1.0% $H_2$; 2% to 15%, such as 3% to 10%, for example 4% to 8% $CH_4$; 2% to 40%, such as 3% to 35%, for example 4% to 30%, BTX; 0.1% to 10%, such as 0.2% to 5%, for example 0.3% to 3% oxygenates; and 1% to 15%, such as 2% to 10%, for example 3% to 6% $C_2$-$C_4$ olefins. On a water-free and solids-free basis the raw fluid product stream can comprise a vapor mixture where the sum of CO and $CO_2$ is 30% to 90%, such as 40% to 85%, for example 50% to 80%.

Quenching with water in the vapor/liquid separation system 140 may be conducted at conditions of temperature from −5° C. to 200° C., such as from 10° C. to 100° C., for example from 40° C. to 80° C., and pressure of 150 kPa to 1500 kPa, for example from 300 kPa to 700 kPa. The product resulting from such a water quenching step may then be compressed at conditions of 100 kPa to 8000 kPa, for example 600 kPa to 2000 kPa, and then cooled at conditions of −30° C. to 60° C., for example 5° C. to 30° C.

The solids separation system (e.g. 130 of FIG. 1) of step b) of the present process may include unit operations known to effectively separate entrained catalyst and certain other components from the raw fluid product stream of the CFP process. That raw fluid product stream may comprise entrained catalyst, catalyst fines, char, coke, ash, water, $C_9^+$ aromatics, oxygenates, benzene, toluene, xylenes, CO, $CO_2$, $CH_4$, $N_2$, $H_2$, $C_2$-$C_4$ olefins and paraffins, and other compounds. Embodiments of such unit operations include one or more cyclones (such as, for example, in series), screens, filters, or some combination of these. In some embodiments of the present invention the solids separation system may be excluded.

The quench vapor/liquid separation system (e.g. 140 of FIG. 1) of step c) of the present process may include unit operations known to effectively accomplish separation of the fluid product stream of step b) into a liquid phase stream comprising components selected from the group consisting of water, char, coke, ash, catalyst fines and combinations thereof, and a vapor phase stream comprising benzene, toluene and xylenes. Embodiments of such unit operations include venturi systems, quench systems, condensers, chillers, absorption systems, scrubbers, demisters, or combinations of these.

The product recovery system (e.g. 150 of FIG. 1) of step e) and separation system (e.g. 160 of FIG. 1) of the present process may include unit operations known to effectively accomplish/enhance separation and recovery of benzene, toluene, xylenes and other aromatic compounds from the vapor phase stream of step c). Embodiments of such unit operations include distillers, condensers, chillers, absorption systems, demisters, or combinations of these.

The steam stripping system (e.g. 111 of FIG. 1) of step g) of the present process may include unit operations known to effectively accomplish stripping away matter which causes deactivation of the catalyst composition during CFP in the fluidized bed reactor. The steam stripping system effectively removes or displaces volatile compounds and combustible gases including CO, $H_2$, $CH_4$, and light hydrocarbons so that the gas phase contains few combustible components. The combustible gas components are essentially prevented from passing into the regenerator.

The catalyst composition regeneration system (e.g. 120 of FIG. 1) of step i) of the present process may include unit operations known to effectively accomplish regeneration of steamed, spent catalyst material sufficiently to send it back into service as catalyst composition in the fluidized bed reactor. Embodiments of such unit operations include fluid beds, fixed beds, bubbling beds, riser reactors, circulating beds, or the like as are known to those skilled in the art. Heat can optionally be recovered in the regeneration system and used within the process, e.g. to heat reactor 110, or to drive compressors, or generate electricity, or the like, or can be otherwise utilized.

The fluid solvent stream of step d) and its use in the process is necessary to achieve the improvement of the present invention. Fouling (gunk) manufactured in the CFP process is only slightly soluble in low polarity aromatics and will deposit over time in critical process lines at conditions of the CFP process. We have found that polar molecules, preferably polar aromatic molecules, e.g. phenol, need to be present, such as in mixture with aromatics, to have an effective solvent for gunk mitigation.

A convenient polarity value is the Snyder Polarity Index (SPI) that ranks materials by their polarity when used as a solvent. Values of the SPI include:

| SPI | Solvent |
|---|---|
| 0 | cyclohexane |
| 0 | n-hexane |
| 0.3 | n-decane |
| 0.4 | i-octane |
| 1.7 | butyl ether |
| 2.2 | i-propyl ether |
| 2.3 | toluene |
| 2.4 | p-xylene |
| 2.9 | t-butyl methyl ether |
| 3 | benzene |
| 3.3 | benzyl ether |
| 3.4 | dichloromethane |
| 3.9 | 1-butanol |
| 3.9 | i-butyl alcohol |
| 4.2 | tetrahydrofuran |
| 4.3 | ethyl acetate |
| 4.3 | 1-propanol |
| 4.3 | 2-propanol |
| 4.4 | methyl acetate |
| 4.5 | cyclohexanone |
| 4.5 | methyl ethyl ketone (MEK) |
| 4.6 | benzonitrile |
| 4.8 | 1,4-dioxane |
| 5.2 | ethanol |
| 5.3 | pyridine |
| 5.4 | acetone |
| 5.5 | benzyl alcohol |
| 5.7 | 2-methoxyethanol |
| 6.2 | acetic acid |
| 6.2 | acetonitrile |
| 6.6 | methanol |
| 6.9 | ethylene glycol |
| 9 | water |

A polarity of at least 2.4 SPI is preferred for the fluid solvent mixture for use herein. The fluid solvent stream used herein comprises components providing such polarity, such as, for example, those selected from the group consisting of aliphatic alcohols (e.g., methanol, ethanol, propanol, butanol, pentanol and hexanol), aliphatic ketones (e.g., acetone and methyl ethyl ketone); ethers (e.g. diethyl ether, diphenyl ether, phenyl benzyl ether, phenyl ethyl ether); esters (e.g., methyl acetate, ethyl acetate); phenols (e.g., phenol, o-cresol, m-cresol, p-cresol, catechol, resorcinol and hydroquinone); benzofuran; naphthols (e.g., 1-naphthol and 2-naphthol); and combinations thereof. Preferably the fluid solvent stream is derived from one or more product streams of the CFP process. Preferably the fluid solvent stream comprises one or more oxygenates.

The process steps require feeding the fluid solvent stream comprising such components to one or more of i) the raw fluid product stream from a catalytic fast pyrolysis process fluidized bed reactor to a first separation system, ii) the fluid product stream from the first separation system to a quench vapor/liquid separation system, iii) the vapor phase stream from the quench vapor/liquid separation system to a product recovery system, and, optionally, to the spent catalyst steam stripping system upstream of the catalyst regeneration system. The fluid solvent stream will comprise from 10% to 100%, such as from 20% to 99%, such polar components. The fluid solvent stream may comprise from about 10% to about 99% of the phenols, naphthols or benzofuran, or a combination thereof, recovered in step e), which are recycled to the fluid solvent stream in step f).

The solvent stream of step d) may comprise polar molecules that contain nitrogen or sulfur atoms. Nitrogen-containing and sulfur-containing materials are present in small concentrations in the raw product stream. The nitrogen or sulfur containing materials can be separated from the product streams and used in the solvent stream of step d), or nitrogen or sulfur containing materials from other sources may be introduced in the solvent stream of step d). The nitrogen-containing materials can be amines (e.g. ammonia, primary amines e.g. methyl amine, ethyl amine, and phenyl amine (aniline), secondary amines e.g. dimethyl amine, polyamines, e.g. ethylene diamine, bifunctional amines, e.g. ethanolamine, or the like), nitriles (e.g. acetonitrile and propionitrile), amides (e.g. acetamide), pyrroles (e.g. pyrrole and methyl pyrrole), pyridines (e.g. pyridine and methyl pyridine), or other polar nitrogen-containing compounds. The sulfur-containing materials can be thiophenes (e.g. thiophene and methylthiophene), thiols (e.g. methanethiol and ethanethiol), or other polar sulfur-containing compounds.

The temperature and pressure of the fluid solvent stream will be approximately the temperature and pressure of the process stream into which it is fed. For example, since conditions of the raw fluid product stream from a catalytic fast pyrolysis process (e.g. 10 of FIG. 1) to a first separation system will be 300° C. to 620° C. and 100 kPa to 1500 kPa, the fluid solvent stream fed thereto (e.g. 31 of FIG. 1) will be approximately the same within those ranges. Further, since conditions of the fluid product stream from the first separation system to a quench vapor/liquid separation system (e.g. 20 of FIG. 1) will be 350° C. to 575° C. and 100 kPa to 1500 kPa, the fluid solvent stream fed thereto (e.g. 32 of FIG. 1) will be approximately the same within those ranges. Further, since conditions of the vapor phase stream from the quench vapor/liquid separation system to a product recovery system (e.g. 21 of FIG. 1) will be 25° C. to 100° C. and 100 kPa to 1200 kPa, the fluid solvent stream fed thereto (e.g. 33 of FIG. 1) will be approximately the same within those ranges. Still further, since conditions of the spent catalyst steam stripping system upstream of the catalyst regeneration system (e.g. 111 of FIG. 1) will be 100° C. to 450° C. and 100 kPa to 1500 kPa, the fluid solvent stream fed thereto (e.g. 30 of FIG. 1) will be approximately the same within those ranges.

The fluid solvent stream of step d) may be added to the process streams as above described continuously at a rate sufficient to achieve at least 0.01% by weight of the process stream, or as periodic slugs of at least 0.1% by weight of the process stream every 0.05 to 5 hours of operation.

The following Examples demonstrate the present invention and its capability for use. The invention is capable of other and different embodiments, and its several details are capable of modifications in various apparent respects, without departing from the spirit and scope of the invention. Accordingly, the Example is to be regarded as illustrative in nature and not as restrictive. All percentages are by mass unless otherwise indicated.

EXAMPLE 1

Catalytic fast pyrolysis (CFP) of hardwood was conducted in a fluidized bed reactor. The fluidized bed reactor was 4 inches outer diameter (OD) and 24 inches in height that tapered to 5 inches OD for the final 6 inches and was made of "316" stainless steel. Inside the reactor, the catalyst bed was supported by a distributor plate made of a circular wire mesh plate with openings one inch above the fluidization fluid entry port. The reactor was fitted with a feed hopper with a screw auger that metered biomass out of the hopper into a 0.5 inch OD conduit downward into the reactor.

The reactor was loaded with 1035.4 grams of catalyst prior to the experiment. The hardwood was hammer milled through a ⅛ inch screen, and the entire particle size range was used for the experiments. About 2348 grams of hardwood was weighed and loaded into the feed hopper system. The reactor was purged with a flow of nitrogen at 5.5 SLPM (standard liters per minute) for 30 minutes prior to starting the experiment. A 5915 gram portion of catalyst was loaded into a catalyst hopper and its flow into the reactor through a drop port into the top of the reactor was metered by a rotary valve at 30 grams/minute, and catalyst was removed at the same rate through a port on the lower portion of the reactor through a second rotary valve.

The reactor was heated to 575° C. and the fluidization gas feed tube was heated to approximately 500° C. Biomass flow rate was accurately controlled by the augur inside the hopper that delivers the biomass to the feed tube. The solid biomass (hardwood) was introduced into the reactor from a side feed tube with nitrogen flow. Gas flow rate through the biomass feed tube was 3.2 SLPM to the reactor. The biomass feed rate was adjusted to about 6.3 grams/minute. During reaction, 2.3 SLPM of nitrogen was passed into the reactor through the distributor plate to fluidize the catalyst in addition to the feed tube nitrogen flow.

The reactor effluent exited the reactor from the top through a heated cyclone (400° C.) to remove solid particles, including small catalyst and char. The effluent exiting the cyclone flowed into a product collection system that included two knock out (KO) pots and a coil condenser. The KO pots were placed in an ice water bath; and the coil condenser was cooled in a dry ice/isopropanol bath. The uncondensed gas phase products that exited the last condenser were collected for analysis. Three experiments were conducted. In the first two experiments the condenser coil fouling, i.e. clogging, after 180 and 155 minutes on stream, respectively. Each time the collection train was cleaned, the feed hoppers were re-charged, and the reaction was re-started. Before the third experiment an inlet port was added to the transfer line between the second KO pot and the coil condenser. The inlet was fitted with two valves to admit solvent but prevent exposure to the atmosphere.

During the third experiment, 4 ml aliquots of acetone (SPI of 5.4) were added approximately every 30 minutes into the feed to the coil condenser during the experiment. The solvent addition rate was approximately 2% of the biomass feed rate integrated over 30 minute time periods. The unit was operated continuously for 285 minutes without experiencing a clog or a rise in the system pressure indicating that the acetone was effective in reducing or eliminating the condensation of heavy hydrocarbons in the coil condenser that led to fouling.

EXAMPLE 2

In this experiment, a sample of about 3 grams of tarry solids (gunk) collected from a CFP process KO pot as described in Example 1 was placed in each of two small beakers. In one beaker 10.34 grams of toluene was added to the tarry solids. Some material dissolved but a significant portion remained in the solid phase. In a second beaker approximately 10.60 grams of a mixture of toluene and phenol in a 4:1 mass ratio was added as solvent. The entire tarry solid dissolved providing a yellow-brown solution.

The Table below presents analysis of the mixture obtained when toluene (SPI of 2.3) was used to extract the gunk and of the mixture when a toluene/phenol mixed solvent was used to extract the gunk. The data shown in the table establishes that many components are not fully or even partially dissolved in toluene, and that a more polar solvent such as required in the present invention is needed for preventing fouling of various critical process lines in a CFP process which are likely to transfer heavy hydrocarbons, aromatics, and oxygenates.

|  | Normalized Area % | |
| --- | --- | --- |
| Compound | Toluene | Toluene/Phenol |
| beta-D-Glucopyranose, 1,6-anhydro- | 0.0% | 11.1% |
| 1,2,3-Benzenetriol | 0.0% | 1.6% |
| 1,2-Benzenediol, 3-methyl- | 8.7% | 3.2% |
| 1,2-Benzenediol, 4-methyl- | 7.6% | 2.7% |
| 1,4-Benzenediol, 2,6-dimethyl- | 1.1% | 1.4% |
| 1,4-Benzenediol, 2-methyl- | 1.1% | 0.0% |
| 1,5-Dihydroxy-1,2,3,4-tetrahydronaphthalene | 0.0% | 1.0% |
| 1H-Indene-1,2-diol, 2,3-dihydro- | 2.2% | 0.0% |
| 1H-Indenol | 1.1% | 4.2% |
| 2-Cyclopenten-1-one | 1.1% | 0.0% |
| 2-Cyclopenten-1-one, 2,3-dimethyl- | 1.1% | 0.0% |
| 2-Cyclopenten-1-one, 2-hydroxy-3-methyl- | 1.1% | 0.0% |
| 2-Cyclopenten-1-one, 3-methyl- | 2.2% | 0.0% |
| 2-Methylresorcinol, acetate | 2.2% | 0.0% |
| 1-Naphthalenol | 0.0% | 1.2% |
| 1-Naphthalenol, 2-methyl- | 0.0% | 5.5% |
| 2-Naphthalenol | 0.0% | 11.2% |
| 4-Ethylcatechol | 4.4% | 1.1% |
| 5-Methoxyindane | 0.0% | 0.6% |
| 7-Methylindan-1-one | 1.1% | 0.0% |
| 9H-Fluorene, 1-methyl- | 0.0% | 1.1% |
| Acenaphthene | 0.0% | 1.4% |
| Anthracene | 0.0% | 4.2% |
| Anthracene | 0.0% | 0.6% |
| Anthracene, 2-methyl- | 0.0% | 0.7% |
| Anthracene, 9-methyl- | 0.0% | 4.5% |
| Benzene, 1-ethyl-4-methoxy- | 2.2% | 0.0% |
| Benzene, 1-butynyl- | 0.8% | 0.0% |
| Benzofuran, 2,3-dihydro- | 1.1% | 0.5% |
| Carbamic acid | 0.0% | 7.4% |
| Catechol | 16.4% | 1.2% |
| Cyclohexane, ethyl- | 1.1% | 0.9% |
| Ethylbenzene | 1.1% | 1.2% |
| Fluorene | 0.0% | 4.6% |
| Hydroquinone | 0.0% | 3.5% |
| Naphthalene, 1-methyl- | 0.0% | 6.1% |
| Naphthalene, 2,6-dimethyl- | 0.0% | 0.5% |
| Orcinol | 0.0% | 2.2% |
| o-,p-Xylene | 13.1% | 5.0% |
| p-Cresol | 7.6% | 0.0% |
| Phenol | 2.2% | 0.0% |
| Phenol, 2,3,6-trimethyl- | 1.1% | 0.0% |
| Phenol, dimethyl- | 6.5% | 4.6% |
| Phenol, 2-methyl- | 3.3% | 0.0% |
| Phenol, ethyl- | 3.3% | 0.5% |
| Phenol, 4-ethyl-2-methoxy- | 1.1% | 0.0% |
| Resorcinol monoacetate | 3.3% | 0.0% |
| Styrene | 1.1% | 0.0% |

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. An improved catalytic fast pyrolysis process comprising steps of:
   a) feeding biomass, catalyst composition, and transport fluid to a catalytic fast pyrolysis process fluidized bed reactor maintained at reaction conditions to manufacture a raw fluid product stream,
   b) feeding the raw fluid product stream of step a) to a solids separation system to produce separated solids and a fluid product stream,
   c) feeding the fluid product stream of step b) to a quench vapor/liquid separation system utilizing water or hydrocarbon quench to produce a liquid phase stream comprising water, char, coke, ash, catalyst fines, oxygenates, and $C_9^+$ aromatics, and a vapor phase stream comprising carbon monoxide, carbon dioxide, hydrogen, olefins, and aromatics, said aromatics selected from the group consisting of benzene, toluene, xylenes, phenols, naphthols, benzofuran, ethylbenzene, styrene, naphthalene, methylnaphthalene and combinations thereof,
   d) feeding a fluid solvent stream comprising a polar organic compound to one or more of i) the raw fluid product stream of step a), ii) the fluid product stream of step b), and iii) the vapor phase stream of step c),
   e) feeding the vapor phase stream of step c) to a product recovery system and recovering therefrom benzene, toluene, xylenes, phenols, naphthols, benzofuran, ethylbenzene, propylbenzene, cumene, 1,2,3-trimethylbenzene, styrene, naphthalene, methylnaphthalene, or combination thereof, and
   f) recycling at least a portion of the recovered phenols, naphthols and benzofuran of step e) to the fluid solvent stream of step d).

2. The process of claim 1 wherein the fluid solvent stream of step d) comprises from 10% to 100% polar organic compound.

3. The process of claim 1 wherein the fluid solvent stream of step d) comprises components selected from the group consisting of aliphatic alcohols, aliphatic ketones, esters, ethers, phenols, naphthols, benzofuran, and combinations thereof.

4. The process of claim 1 wherein the fluid solvent stream of step d) comprises amines, secondary amines, polyamines, bifunctional amines, nitriles, amides, pyrroles, pyridines, or other polar nitrogen-containing compounds, or thiophenes, thiols, or other polar sulfur-containing compounds.

5. The process of claim 1 comprising steps of: g) feeding spent catalyst composition of the fluidized bed reactor of step a) to a steam stripping system to produce product catalyst composition, h) optionally feeding a fluid solvent stream comprising components selected from the group consisting of aliphatic alcohols, aliphatic ketones, esters, ethers, phenols, naphthols, benzofuran, and combinations thereof to the steam stripping system of step g), i) feeding the product catalyst composition of step g) to a catalyst composition regeneration system, and j) returning regenerated catalyst composition from the regeneration system of step i) to the fluidized bed reactor step a).

6. The process of claim 1 comprising the step: k) recycling at least a portion of the recovered toluene of step e) to the fluidized bed reactor of step a).

7. The process of claim 6 wherein from about 5% to about 99% of the recovered toluene of step e) is recycled to the fluidized bed reactor of step a).

8. The process of claim 7 wherein from about 30% to about 50% of the recovered toluene of step e) is recycled to the fluidized bed reactor of step a).

9. The process of claim 1 comprising the step: l) recycling at least a portion of the recovered toluene of step e) to the fluid solvent stream of step d).

10. The process of claim 1 comprising the step m) separating at least a portion of the olefins from the vapor phase stream of step c), and step n) recycling at least a portion of the separated olefins of step m) to the fluidized bed reactor of step a).

11. The process of claim 1 wherein the catalyst composition of step a) comprises a crystalline molecular sieve characterized by a silica/alumina mole ratio greater than 12 and a Constraint Index from 1 to 12.

12. The process of claim 1 wherein the fluidized bed reaction conditions include a temperature of from 300° C. to 1000° C. and pressure from 100 kPa to 1500 kPa.

13. The process of claim 11 wherein the crystalline molecular sieve of the catalyst composition of step a) is characterized by a silica/alumina mole ratio from greater than 12 to 240 and a Constraint Index from 5 to 10.

14. The process of claim 11 wherein the catalyst composition of step a) comprises a crystalline molecular sieve having the structure of ZSM-5, ZSM-11, ZSM-12, ZSM-22, ZSM-23,ZSM-35, ZSM-48, ZSM-50 or combinations thereof.

15. The process of claim 14 wherein the catalyst composition of step a) comprises a crystalline molecular sieve having the structure of ZSM-5.

16. The process of claim 1 wherein the fluid solvent stream is fed to the raw fluid product stream of step a).

17. The process of claim 1 wherein the fluid solvent stream is fed to the fluid product stream of step b).

18. The process of claim 1 wherein the fluid solvent stream is fed to the vapor phase stream of step c).

19. The process of claim 1 wherein from about 10% to about 99% of the recovered phenols, naphthols, benzofuran, or combination thereof, of step e) is recycled to the fluid solvent stream of step d).

20. The process of claim 1 wherein the solids separation system of step b) comprises a cyclone or series of cyclones.

21. The process of claim 1 wherein the fluid solvent stream of step d) comprises a component selected from the group consisting of acetone, methyl ethyl ketone, phenol, o-cresol, m-cresol, p-cresol, catechol, resorcinol, hydroquinone, 1-naphthol, 2-naphthol, benzofuran and combinations thereof.

22. The process of claim 21 wherein the fluid solvent stream of step d) comprises phenol.

23. The process of claim 1 wherein the fluid solvent of step d) has a Snyder Polarity Index of at least 2.4.

24. The process of claim 1 wherein the fluid solvent stream of step d) is added to the process streams continuously at a rate sufficient to achieve at least 0.01% by weight of the process stream or as periodic slugs of at least 0.1% by weight of the process stream every 0.05 hour to 5 hours of operation.

25. The process of claim 1 wherein the biomass of step a) comprises biodegradable wastes or byproducts that can be burned as fuel or converted to chemicals, comprising municipal wastes, green waste, byproducts of farming including animal manures, food processing wastes, sewage sludge, and black liquor from wood pulp or algae, wood, wood chips, forestry waste, rice straw, rice hulls, rice bran, old rice, corn, sugarcane, cassava, sago palm, bean curd, corn cob, tapioca, bagasse, vegetable oil residues, potatoes, buckwheat, soybean, oils and fats, waste paper, paper manufacturing residues, marine product residues, or combinations thereof.

26. An improved catalytic fast pyrolysis process comprising steps of:
- a) feeding biomass, catalyst composition comprising a crystalline molecular sieve, and transport fluid to a catalytic fast pyrolysis process fluidized bed reactor maintained at reaction conditions including a temperature from 300° C. to 1000° C., pressure from 100 kPa to 1500 kPa and catalyst-to-biomass mass ratio of from 0.1 and 40 to manufacture a raw fluid product stream,
- b) feeding the raw fluid product stream of step a) to a solids separation system to produce separated solids and a fluid product stream,
- c) feeding the fluid product stream of step b) to a quench vapor/liquid separation system utilizing water or hydrocarbon quench to produce a liquid phase stream comprising water, char, coke, ash, catalyst fines, oxygenates and $C_9^+$ aromatics, and a vapor phase stream comprising carbon monoxide, carbon dioxide, hydrogen, olefins and aromatics, said aromatics selected from the group consisting of benzene, toluene, xylenes, phenols, naphthols, benzofuran, ethylbenzene, styrene, naphthalene, methylnaphthalene and combinations thereof,
- d) feeding a fluid solvent stream comprising components selected from the group consisting of methanol, ethanol, propanol, butanol, pentanol, hexanol, acetone, methyl ethyl ketone, phenol, o-cresol, m-cresol, p-cresol, catechol, resorcinol, hydroquinone, 1-naphthol, 2-naphthol, benzofuran, methyl acetate, ethyl acetate, and combinations thereof to one or more of i) the raw fluid product stream of step a), ii) the fluid product stream of step b), and iii) the vapor phase stream of step c),
- e) feeding the vapor phase stream of step c) to a product recovery system and recovering therefrom benzene, toluene, xylenes, phenols, naphthols, benzofuran, ethylbenzene, propylbenzene, cumene, 1,2,3-trimethylbenzene, styrene, naphthalene, and/or methylnaphthalene,
- f) recycling from about 10% to about 99% of the recovered phenols, naphthols and/or benzofuran of step e) to the fluid solvent stream of step d),
- g) feeding spent catalyst composition of the fluidized bed reactor of step a) to a steam stripping system to produce product catalyst composition,
- h) optionally feeding a fluid solvent stream comprising components selected from the group consisting of methanol, ethanol, propanol, butanol, pentanol, hexanol, acetone, methyl ethyl ketone, phenol, o-cresol, m-cresol, p-cresol, catechol, resorcinol, hydroquinone, 1-naphthol, 2-naphthol, benzofuran, methyl acetate, ethyl acetate, and combinations thereof to the steam stripping system of step g),
- i) feeding the product catalyst composition of step g) to a catalyst composition regeneration system, and
- j) returning regenerated catalyst composition from the regeneration system of step i) to the fluidized bed reactor step a).

27. The process of claim 26 wherein the catalyst composition comprises binder material selected from the group consisting of porous inorganic oxide, clay or combinations thereof.

28. The process of claim 27 wherein the inorganic oxide comprises alumina, zirconia, silica, magnesia, thoria, titania, boria or combinations thereof.

29. The process of claim 26 wherein a crystalline molecular sieve of the catalyst composition of step a) has the structure of ZSM-5.

30. The process of claim 26 wherein from about 5% to about 99% of the recovered toluene of step e) is recycled to the fluidized bed reactor of step a).

31. The process of claim 26 wherein from about 30% to about 90% of the recovered toluene of step e) is recycled to the fluid solvent stream of step d).

* * * * *